(12) United States Patent
Sugiyama et al.

(10) Patent No.: US 7,245,317 B2
(45) Date of Patent: Jul. 17, 2007

(54) IMAGING DEVICE HAVING A LUMINOUS PROFILE DETECTING ELEMENT

(75) Inventors: Yukinobu Sugiyama, Hamamatsu (JP); Haruyoshi Toyoda, Hamamatsu (JP); Naohisa Mukozaka, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 579 days.

(21) Appl. No.: 10/499,209

(22) PCT Filed: Dec. 10, 2002

(86) PCT No.: PCT/JP02/12887

§ 371 (c)(1),
(2), (4) Date: Jun. 18, 2004

(87) PCT Pub. No.: WO03/055201

PCT Pub. Date: Jul. 3, 2003

(65) Prior Publication Data

US 2005/0041124 A1 Feb. 24, 2005

(30) Foreign Application Priority Data

Dec. 21, 2001 (JP) ............................. 2001-389567

(51) Int. Cl.
*H04N 5/228* (2006.01)
*H04N 3/14* (2006.01)
*H04N 5/335* (2006.01)
*H04N 5/225* (2006.01)
*H01L 27/00* (2006.01)

(52) U.S. Cl. ................ 348/208.14; 348/169; 348/308; 250/208.1

(58) Field of Classification Search ................ 348/169, 348/170, 208.1, 208.6, 208.13, 208.14, 281, 348/302, 303, 304, 307, 308; 250/208.1, 250/203.1; 396/153; 382/103, 107
See application file for complete search history.

(56) References Cited

U.S. PATENT DOCUMENTS 5,602,415 A   2/1997   Kubo et al. .................. 257/443

(Continued)

FOREIGN PATENT DOCUMENTS

EP         0 659 013        6/1995

(Continued)

OTHER PUBLICATIONS

Okamoto et al., "Development of a CMOS Imager with Focal-Plane Motion Detectors", CMOS LSI, vol. J83-C, No. 6, pp. 471-478, (2000); (w/ English Abstract).

*Primary Examiner*—John M. Villecco
(74) *Attorney, Agent, or Firm*—Drinker Biddle & Reath LLP

(57) ABSTRACT

A photosensitive region includes a semiconductor substrate 40 made of a P-type semiconductor, and N-type semiconductor regions 41, 42 and 43 formed on the surface of the semiconductor substrate 40. Accordingly, the first photosensitive portion includes a portion of the semiconductor substrate 40 and the semiconductor regions 41, thus configuring a photodiode. The photosensitive region on one side contained in the second photosensitive region includes a portion of the semiconductor substrate 40 and the semiconductor regions 42, thus configuring a photodiode. The photosensitive region on the other side contained in the second photosensitive region includes a portion of the semiconductor substrate 40 and the semiconductor regions 43, thus configuring a photodiode. Each of the semiconductor regions 42 and 43 is in a shape of an approximate triangle, and is formed so that one side of the regions 42 is adjacent to one side of the region 43, and vice versa, in one pixel.

7 Claims, 12 Drawing Sheets

U.S. PATENT DOCUMENTS

| | | | |
|---|---|---|---|
| 5,602,585 A * | 2/1997 | Dickinson et al. | 348/155 |
| 5,694,495 A | 12/1997 | Hara et al. | 382/324 |
| 5,886,343 A | 3/1999 | Miyawaki et al. | 250/208.1 |
| 6,091,449 A * | 7/2000 | Matsunaga et al. | 348/308 |
| 6,384,396 B1 | 5/2002 | Mizuno et al. | 250/208.1 |
| 6,452,153 B1 * | 9/2002 | Lauxtermann et al. | 348/302 |
| 6,700,110 B2 * | 3/2004 | Mizuno et al. | 348/307 |
| 6,867,806 B1 * | 3/2005 | Lee et al. | 348/308 |
| 6,891,143 B2 * | 5/2005 | Knee et al. | 348/308 |
| 6,919,549 B2 * | 7/2005 | Bamji et al. | 250/208.1 |
| 6,953,924 B2 * | 10/2005 | Boubal et al. | 348/169 |
| 6,956,605 B1 | 10/2005 | Hashimoto | 348/301 |
| 7,030,356 B2 * | 4/2006 | Pain et al. | 250/208.1 |
| 7,081,608 B2 * | 7/2006 | Bock | 250/208.1 |
| 7,105,793 B2 * | 9/2006 | Rhodes | 348/308 |
| 7,148,462 B2 * | 12/2006 | Bock | 348/302 |
| 2002/0085105 A1 * | 7/2002 | Sohn | 348/308 |
| 2002/0121652 A1 * | 9/2002 | Yamasaki | 348/308 |
| 2003/0081132 A1 | 5/2003 | Kuno et al. | 348/222.1 |
| 2004/0195490 A1 * | 10/2004 | Sugiyama et al. | 250/208.1 |
| 2006/0163448 A1 * | 7/2006 | Sugiyama et al. | 250/208.1 |
| 2006/0261245 A1 * | 11/2006 | Sugiyama et al. | 250/208.1 |
| 2006/0273238 A1 * | 12/2006 | Sugiyama et al. | 250/208.1 |

FOREIGN PATENT DOCUMENTS

| | | |
|---|---|---|
| JP | 04-151129 | 5/1992 |
| JP | 04151129 A * | 5/1992 |
| JP | 04-277984 | 10/1992 |
| JP | 06-005832 | 1/1994 |
| JP | 2000-316127 | 11/2000 |
| JP | 2001177144 A * | 6/2001 |
| WO | WO 00/45592 | 3/2000 |

* cited by examiner

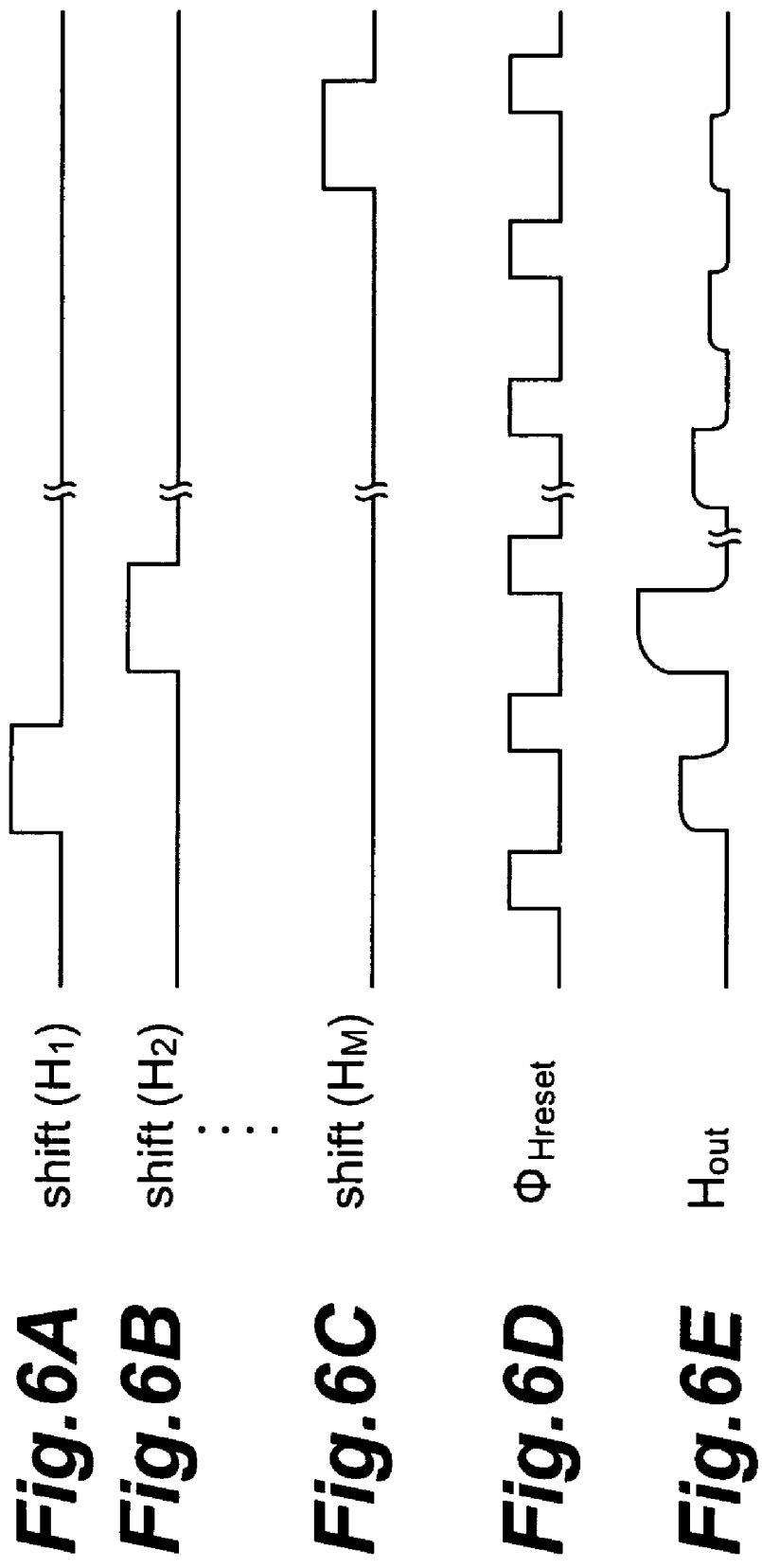

Fig.7A  shift ($V_1$)
Fig.7B  shift ($V_2$)
Fig.7C  shift ($V_N$)
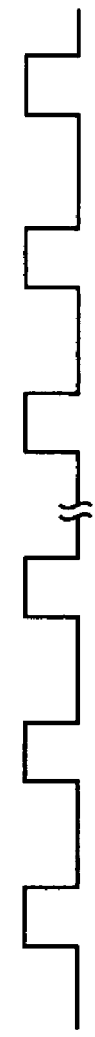
Fig.7D  $\Phi_{Vreset}$
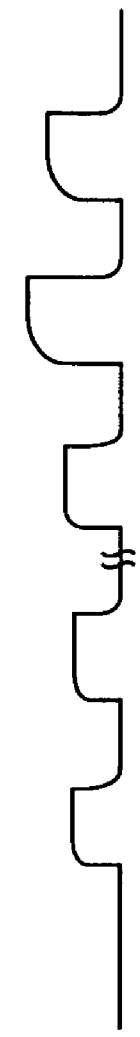
Fig.7E  $V_{out}$

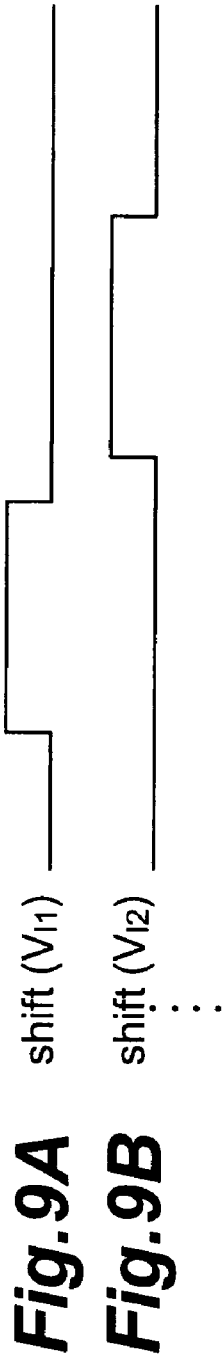
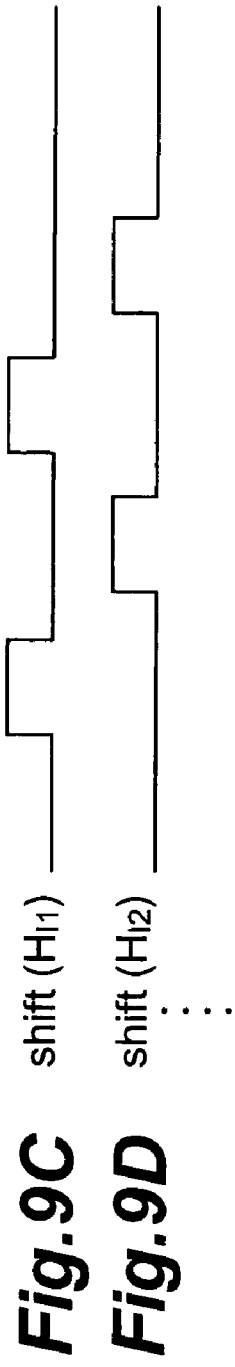
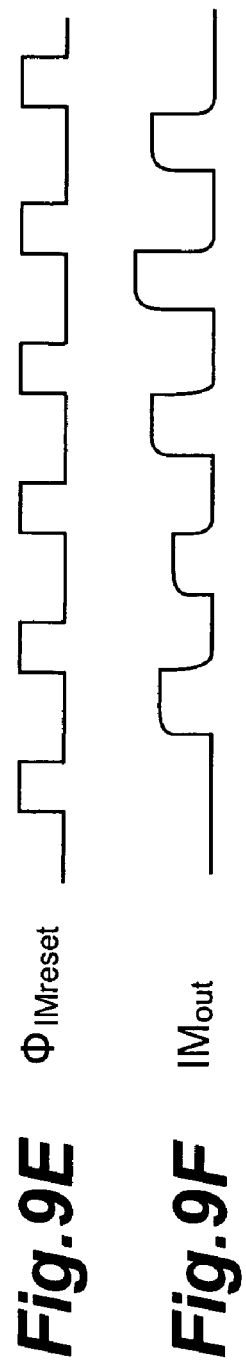
Fig.9A  shift (V_{I1})
Fig.9B  shift (V_{I2}) . . .
Fig.9C  shift (H_{I1})
Fig.9D  shift (H_{I2}) . . .
Fig.9E  $\Phi_{IMreset}$
Fig.9F  IMout

IMAGING DEVICE HAVING A LUMINOUS PROFILE DETECTING ELEMENT

FIELD OF THE ART

This invention relates to an imaging device.

BACKGROUND ART

It has been hitherto conventional to detect an image by using a solid-state imaging device such as a CMOS type image sensor or the like to.

DISCLOSURE OF THE INVENTION

However, it has been hitherto impossible to detect both an image based on image-pickup and two-dimensional positions where light is incident.

The present invention is accomplished in the light of the foregoing circumstances; an object of the invention is to provide an imaging device which can detect both an image and two-dimensional positions where light is incident.

An imaging device according to the present invention which has a photosensitive region containing two-dimensionally arrayed pixels, wherein one pixel is configured by a first photosensitive portion and a second photosensitive portion which output corresponding to the intensity of light incident thereto, and the imaging device comprises an image detecting element for reading an output from the first photosensitive portion and detecting an image on the basis of the output concerned; and a luminous profile detecting element for reading out an output from the second photosensitive portion and detecting luminous profiles in a first direction and a second direction in the two-dimensional array on the basis of the output concerned.

In the imaging device according to the present invention, light incident on one pixel is detected by each of the first photosensitive portion and the second photosensitive portion that configure the pixel concerned, and the output corresponding to the light intensity is gained for every photosensitive portion. The image detecting element reads out the output from the first photosensitive portion and detects an image on the basis of the output concerned. Furthermore, the luminous profile detecting element reads out the output from the second photosensitive portion and detects the luminous profiles in the first direction and the second direction in the two-dimensional array on the basis of the output concerned. As described above, since one pixel is configured by the first photosensitive portion and the second photosensitive portion, it is possible to detect both an image and two-dimensional positions where light is incident.

Furthermore, it is preferable that a wire for leading the outputs from the first photosensitive portions to the image detecting element and a wire for leading the outputs from the second photosensitive portions to the luminous profile detecting element are disposed so as to extend between the pixels. In the case of the above construction, each of the wires will not prevent light from being incident to the first photosensitive portions and the second photosensitive portions, thus suppressing a detection sensitivity reduction.

Still furthermore, it is preferable that the second photosensitive portion contains a plurality of photosensitive portions which are arranged so as to be adjacent to one another on the same plane, the photosensitive portions on one side, amongst the plurality of photosensitive portions contained in the second photosensitive portions, are electrically connected to each other across the plurality of pixels arrayed in the first direction in the two-dimensional array; and the photosensitive portions on the other side, amongst the plurality of photosensitive portions contained in the second photosensitive portions, are electrically connected to each other across the plurality of pixels arrayed in the second direction in the two-dimensional array. In the case of the above construction, light incident to second photosensitive portion is detected by each of the photosensitive portions contained in the second photosensitive portion concerned, and electric current corresponding to the light intensity sensed by each photosensitive portion is outputted. Since the photosensitive portions on one side are electrically connected to each other across the plurality of pixels arrayed in the first direction in the two-dimensional array, electric currents from the photosensitive portions on one side are thereafter transmitted to the first direction. Furthermore, since the photosensitive portions on the other side are electrically connected to each other across the plurality of pixels arrayed in the second direction in the two-dimensional array, electric currents from the photosensitive portions on the other side are thereafter transmitted to the second direction. As described above, the electric currents from the photosensitive portions on one side are transmitted in the first direction, and the electric currents from the photosensitive portions on the other side are transmitted in the second direction, so that both of the luminous profile in the first direction and the luminous profile in the second direction are obtained independently. As a result, fast detection of the two-dimensional positions of the incident light becomes possible with an extremely simple structure that a plurality of photosensitive portions are arranged in one pixel.

Furthermore, it is preferable that a wire for electrically connecting the photosensitive portions on one side, amongst the plurality of photosensitive portions contained in the second photosensitive portions, to each other across the plurality of pixels arrayed in the first direction, is disposed so as to extend in the first direction between the pixels, and a wire for electrically connecting the photosensitive portions on the other side, amongst the plurality of photosensitive portions contained in the second photosensitive portions, to each other across the plurality of pixels arrayed in the second direction is disposed so as to extend in the second direction between the pixels. In the case of the above construction, each of the wires will not prevent light from being incident to the photosensitive portions, thus suppressing a detection sensitivity reduction.

Still furthermore, it is preferable that the second photosensitive portion outputs an electric current corresponding to the intensity of incident light, and the luminous profile detecting element comprises: a first luminous profile detecting shift register for sequentially reading electric currents in the second direction, the electric currents being from groups of the photosensitive portions on one side which are electrically connected across the plurality of pixels arrayed in the first direction; a second luminous profile detecting shift register for sequentially reading electric currents in the first direction, the electric currents being from groups of the photosensitive portions on the other side which are electrically connected across the plurality of pixels arrayed in the second direction; a first integrating circuit for sequentially receiving the electric currents from each of the groups of photosensitive portions on one side, the electric currents being sequentially read by the first luminous profile detecting shift register, and converts the electric currents into voltages; and a second integrating circuit for sequentially receiving the electric currents from each of the groups of photosensitive portions on the other side, the electric currents being sequentially read by the second luminous profile detecting shift register, and converts the electric currents into voltages. In the case of this construction, the luminous profile in the first direction and the luminous profile in the second direction can be obtained with an extremely simple structure.

Furthermore, it is preferable that the first photosensitive portion outputs an electric current corresponding to the intensity of incident light, and the image detector comprises a first image detecting shift register for sequentially reading electric currents from the first photosensitive portions in the first direction; and second image detecting shift register for sequentially reading electric currents in the second direction, the electric currents being sequentially read by first image detecting shift register. In the case of this construction, the image can be obtained with an extremely simple structure.

Still furthermore, it is preferable that the luminous profile detecting element contains a first image position specifying element for specifying pixel positions having predetermined luminous or more in the detected luminous profile in the first direction; and a second image position specifying element for specifying pixel positions having predetermined luminous or more in the detected luminous profile in the second direction, and wherein the image detecting element detects an image containing the respective pixel positions specified by the first pixel position specifying element and the second pixel position specifying element. In the case of the above construction, an image containing an area having predetermined luminous or more can be obtained at extremely high speed. Furthermore the imaging device of this invention is applicable to a moving body tracking sensor or the like.

BRIEF DESCRIPTION OF THE DRAWINGS

FIG. 6A is a graph showing changes over time of a signal outputted from a first luminous profile detecting shift register.

FIG. 6B is a graph showing changes over time of a signal outputted from the first luminous profile detecting shift register.

FIG. 6C is a graph showing changes over time of a signal outputted from the first luminous profile detecting shift register.

FIG. 6D is a graph showing changes over time of a reset signal inputted to a first integrating circuit.

FIG. 6E is a graph showing changes over time of a voltage outputted from the first luminous profile detecting signal processing circuit.

FIG. 7A is a graph showing changes over time of a signal outputted from a second luminous profile detecting shift register.

FIG. 7B is a graph showing changes over time of a signal outputted from the second luminous profile detecting shift register.

FIG. 7C is a graph showing changes over time of a signal outputted from the second luminous profile detecting shift register.

FIG. 7D is a graph showing changes over time of a reset signal inputted to a second integrating circuit.

FIG. 7E is a graph showing changes over time of a voltage outputted from the second luminous profile detecting signal processing circuit.

FIG. 9A is a graph showing changes over time of a signal outputted from a first image detecting shift register.

FIG. 9B is a graph showing changes over time of a signal outputted from the first image detecting shift register.

FIG. 9C is a graph showing changes over time of a signal outputted from a second image detecting shift register.

FIG. 9D is a graph showing changes over time of a signal outputted from the second image detecting shift register.

FIG. 9E is a graph showing changes over time of a reset signal inputted to a third integrating circuit.

FIG. 9F is a graph showing changes over time of a voltage outputted from the third integrating circuit.

BEST MODE FOR CARRYING OUT THE INVENTION

An imaging device according to the present invention will be described with reference to the drawings. In the descriptions that follow, the same constituents or such constituents that have the same functions will be denoted with the same reference numbers, and thus duplicated description is omitted. Hereinafter, parameters M and N are respectively taken as integers of two or greater. In addition, unless otherwise particularly stated, a parameter m is taken as any integer of one or greater but not exceeding M and a parameter n is taken as any integer of one or grater but not exceeding N.

Figure 1:
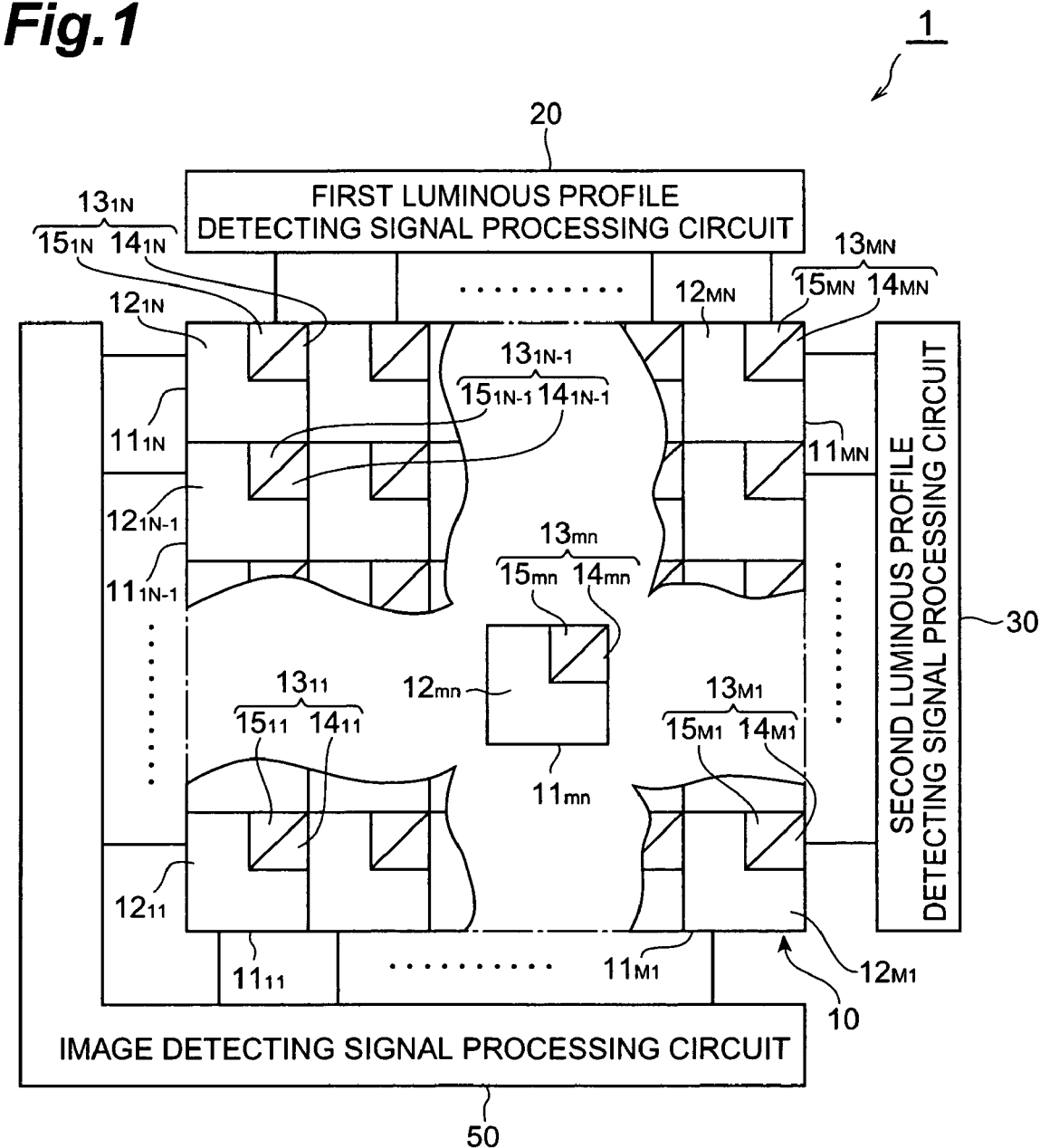
FIG. 1 is a conceptual schematic diagram showing a configuration of an imaging device according to the present embodiment.

FIG. 1 is a conceptual schematic diagram showing a configuration of an imaging device according to the present embodiment. As shown in FIG. 1, the imaging device 1 of this embodiment includes a photosensitive region 10, a first luminous profile detecting signal processing circuit 20, a second luminous profile detecting signal processing circuit 30, and an image detecting signal processing circuit 50. Here, the first luminous profile detecting signal processing circuit 20 and the second luminous profile detecting signal processing circuit 30 constitute a luminous profile detecting element.

In the photosensitive region 10, pixels $11_{mn}$ are two-dimensionally arrayed in M rows and N columns.

One of the pixels is configured by disposing a first photosensitive portion $12_{mn}$ and a second photosensitive portion $13_{mn}$ adjacent to each other within the same plane. The photosensitive portion $12_{mn}$ and $13_{mn}$ respectively output electric currents in accordance with intensities of light that is incident in each of the photosensitive portions. Furthermore, the second photosensitive portion $13_{mn}$ contains a plurality of (two in this embodiment) photosensitive portions $14_{mn}$ and $15_{mn}$ which are disposed so as to be adjacent to each other within the same plane.

Across the plurality of pixels $11_{11}$ to $11_{1N}$, $11_{21}$ to $11_{2N}$, ..., and $11_{M1}$ to $11_{MN}$ that are arrayed in a first direction in the two-dimensional array, the photosensitive portions $14_{mn}$ on one side (for example, photosensitive portions on one side $14_{11}$ to $14_{1N}$) among the plurality of photosensitive portions $14_{mn}$ and $15_{mn}$ contained in the second photosensitive portion $13_{mn}$ are electrically connected to each other. Furthermore, the photosensitive portions $15_{mn}$ on the other side (for example, photosensitive portions on the other side $15_{11}$ to $15_{M1}$) among the plurality of photosensitive portions $14_{mn}$ and $15_{mn}$ contained in the second photosensitive portions $13_{mn}$ are electrically connected to each other.

Figure 2:
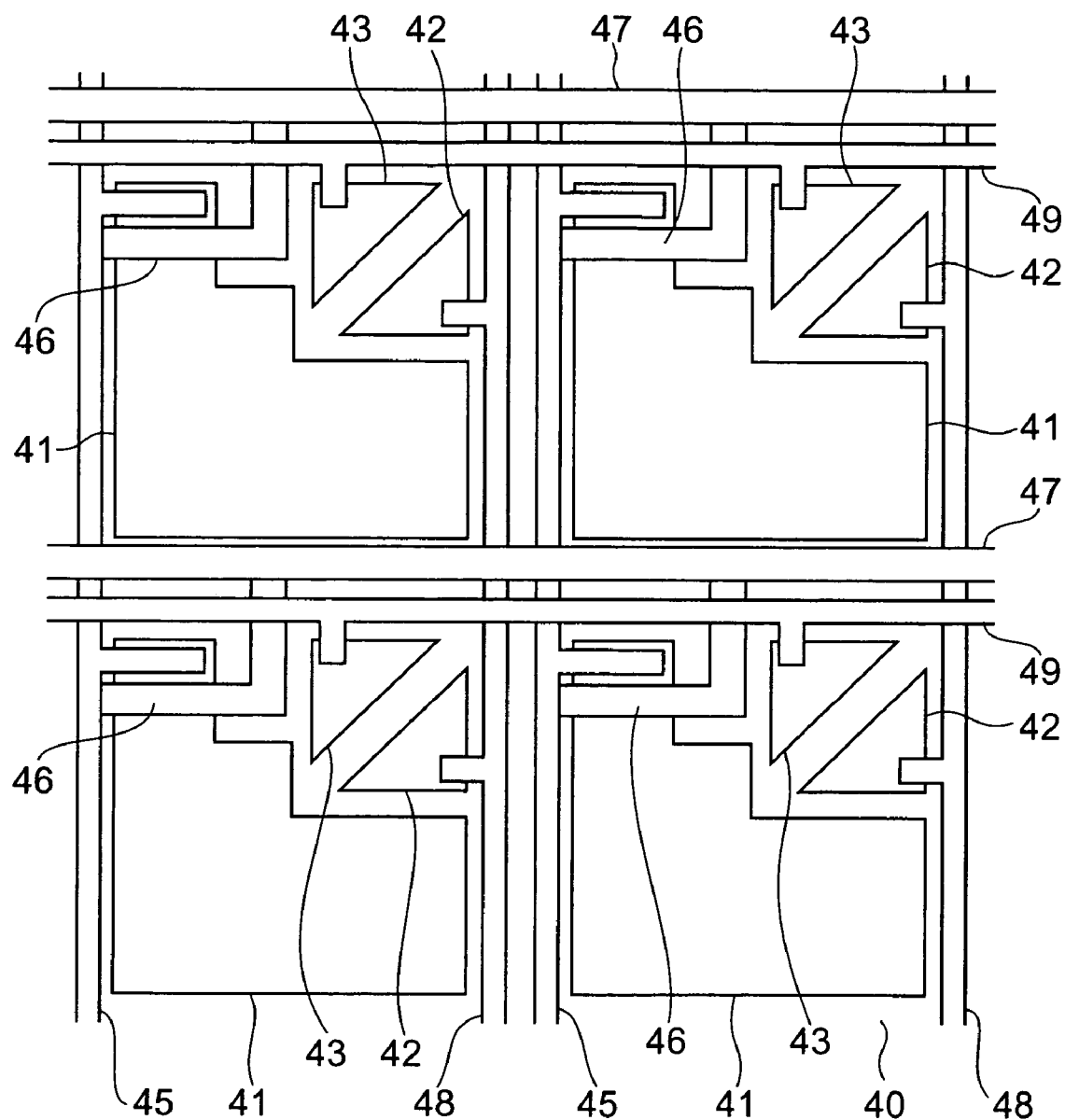
FIG. 2 is an enlarged plan view showing an example of a photosensitive region included in the imaging device according to the present embodiment.
Figure 3:
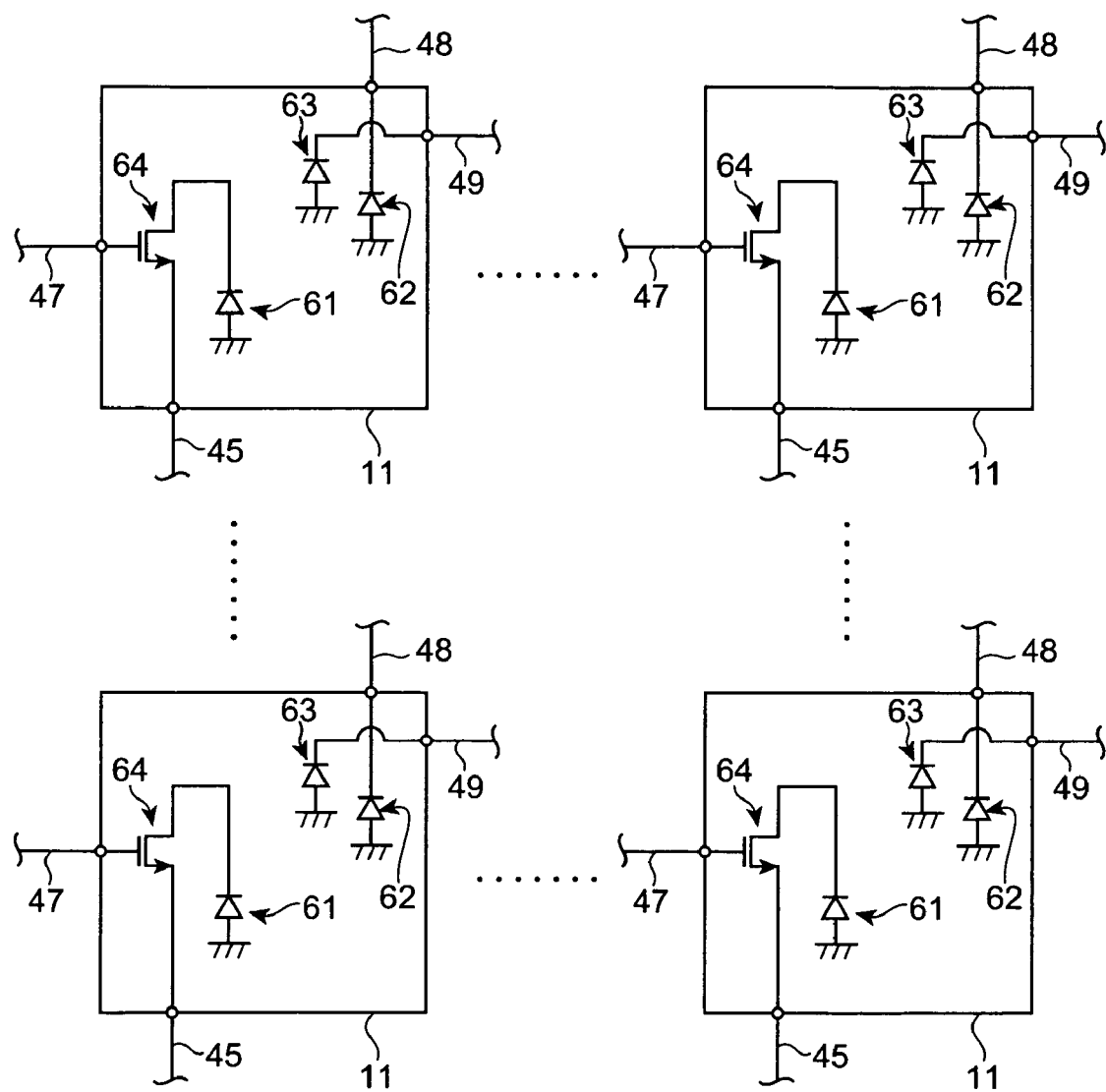
FIG. 3 is a schematic block diagram showing a photosensitive region included in the imaging device according to the present embodiment.

Here, the configuration of the photosensitive region 10 will be described based on FIGS. 2 and 3. FIG. 2 is an enlarged plan view showing an example of a photosensitive region included in the imaging device. FIG. 3 is a schematic block diagram showing a photosensitive region included in the imaging device.

In FIG. 2, depiction of an insulating layer, a protection layer, etc., is omitted.

The photosensitive region 10 includes a semiconductor substrate 40 made of P-type (first conductive type) semiconductor, and N-type (second conductive type) semiconductor regions 41, 42 and 43 formed on the surface of the semiconductor substrate 40.

In this way, the first photosensitive portion $12_{mn}$ includes the semiconductor substrate 40 and the second conductive type semiconductor region 41, thereby constituting a photodiode 61. The photosensitive portions $14_{mn}$ on one side contained in the second photosensitive portion $13_{mn}$ includes the semiconductor substrate 40 and the second conductive type semiconductor region 42, thereby constituting a photodiode 62. The photosensitive portions $15_{mn}$ on the other side contained in the second photosensitive portion $13_{mn}$ includes the semiconductor substrate 40 and the second conductive type semiconductor region 43, thereby constituting a photodiode 63. The first photosensitive portion $12_{mn}$ is constructed as a passive pixel sensor (PPS: Passive Pixel Sensor).

As shown in FIG. 2, each of the second conductive type semiconductor regions 42 and 43 is in a shape of an approximate triangle when viewed from a light incident direction. These two regions 42 and 43 are formed so that one side of each region comes adjacent to each other in one pixel. The semiconductor substrate 40 serves as a ground potential. The photosensitive region 10 may also be configured by including a semiconductor substrate made of N-type semiconductor, and P-type semiconductor regions formed on a surface of the semiconductor substrate.

A first wire 45 is electrically connected to the regions 41 via through-holes (not shown) formed in an insulating layer (not shown). Furthermore, MOS gates 46 made of polysilicon are equipped, and a second wire 47 is electrically connected to the MOS gates 46. The region 41 and the MOS gate 46 constitute a switch element 64 (Field Effect Transistor: FET). The drain of the switch element 64 corresponds to a large area portion of the region 41, and the source thereof is connected to the first wire 45.

A third wire 48 is electrically connected to the regions 42 via through-holes (not shown) formed in the insulating layer (not shown). A fourth wire 49 is electrically connected to the regions 43 via through-holes (not shown) formed in the insulating layer (not shown). The insulating layer is made of $SiO_2$, SiN or the like. The first wire 44 to the fourth wire 49 are made of metal such as Al.

The first wire 45 is for electrically connecting the regions 41 on one side in each of the pixels $11_{mn}$ in the first direction, and is disposed so as to extend in the first direction among the pixels $11_{mn}$. The second wire 47 is for electrically connect the MOS gates 46 in the second direction, and is disposed so as to extend in the second direction among the pixels $11_{mn}$.

The third wire 48 is for electrically connecting the regions 42 in each of the pixels $11_{mn}$ in the first direction, and is disposed so as to extend in the first direction among the pixels $11_{mn}$. Since the regions 42 in each of the pixels $11_{mn}$ are electrically connected by the third wire 48 in this way, the photosensitive portions $14_{mn}$ on one side (for example, photosensitive portions on one side $14_{11}$ to $14_{1N}$) are electrically connected to each other, across the plurality of pixels $11_{11}$ to $11_{1N}$, $11_{21}$ to $11_{2N}$, ..., and $11_{M1}$ to $11_{MN}$ that are arrayed in the first direction in the two-dimensional array. Accordingly, a long photosensitive portion extending in the first direction is configured in the photosensitive region 10. The long photosensitive portions extending in the first direction are formed in M columns.

The forth wire 49 is for electrically connecting the regions 43 in each of the pixel $11_{mn}$ in the second direction, and is disposed so as to extend in the second direction among the pixels $11_{mn}$. Since the regions 43 in each of the pixels $11_{mn}$ are electrically connected by the forth wire 49 in this way, the photosensitive portions $15_{mn}$ on the other side (for example, photosensitive portions on one side $15_{11}$ to $15_{M1}$) are electrically connected to each other, across the plurality of pixels $11_{11}$ to $11_{M1}$, $11_{12}$ to $11_{M2}$, ..., and $11_{1N}$ to $11_{MN}$ that are arrayed in the second direction in the two-dimensional array. Accordingly, a long photosensitive portion extending in the second direction is configured in the photosensitive region 10. The long photosensitive portions extending in the second direction is formed in N rows.

Furthermore, in the photosensitive region 10, M columns of the long photosensitive portions extending in the first direction and N rows of the long photosensitive portions extending in the second direction described above are formed on the same plane.

As is apparent from FIG. 2, the second wire 47 and the fourth wire 49 are connected to each other among the pixels 11 arrayed in the right-and-left direction in FIG. 3, and the first wire 45 and the third wire 48 are connected to each other among the pixels 11 arrayed in the up-and-down direction in FIG. 3.

Shapes of the regions 42 and 43 are not limited to an approximate triangle as illustrated in FIG. 2, and other shapes may be applicable. For example, it may be rectangular or comb-shape when viewed from the light incident direction. Furthermore, the number of these regions may be two or more per pixel. Although the second conductive type semiconductor regions in the first direction and the second conductive type semiconductor regions in the second direction can have a different area from each other within one pixel, each of the regions arrayed in the same direction uniformly has a specific area among the pixels. Specifically, the total areas of photosensitive regions connected by all the wires extending in the same direction may be the same compared to each other.

Figure 4:
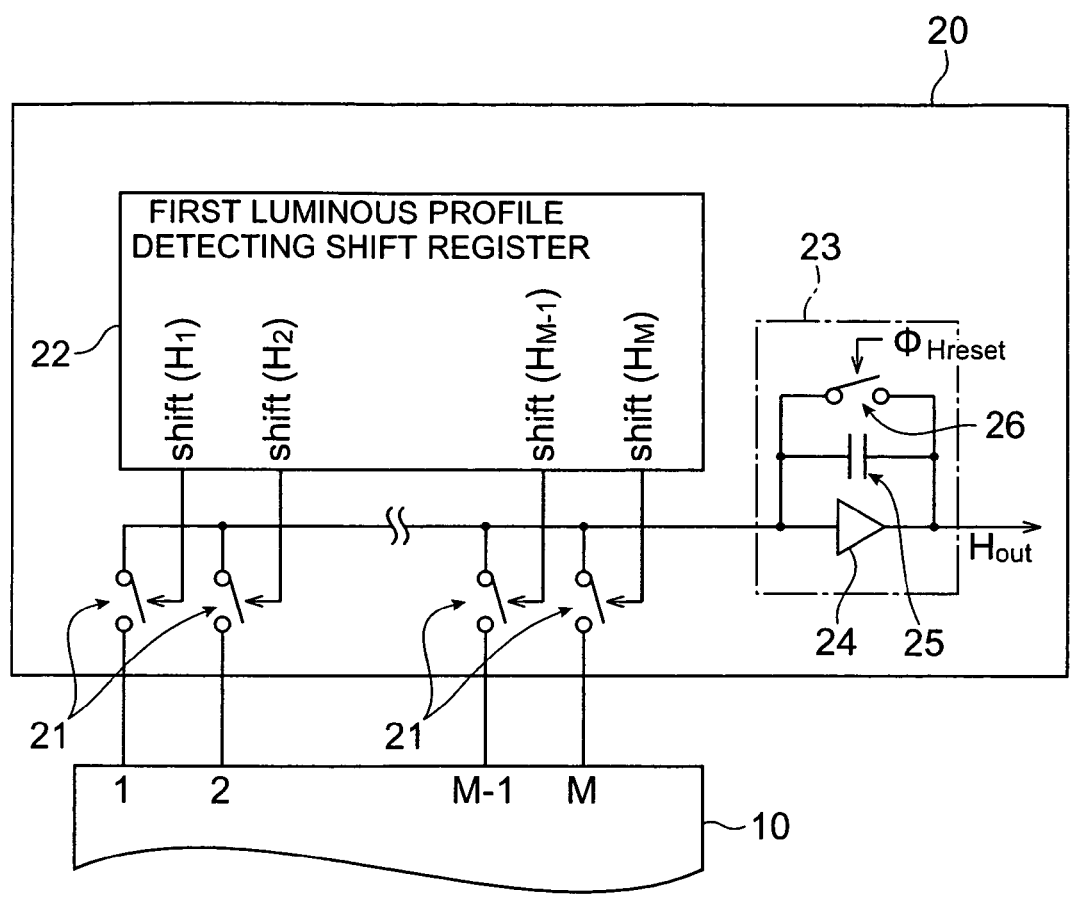
FIG. 4 is a schematic block diagram showing a first luminous profile detecting signal processing circuit included in the imaging device according to the present embodiment.
Figure 5:
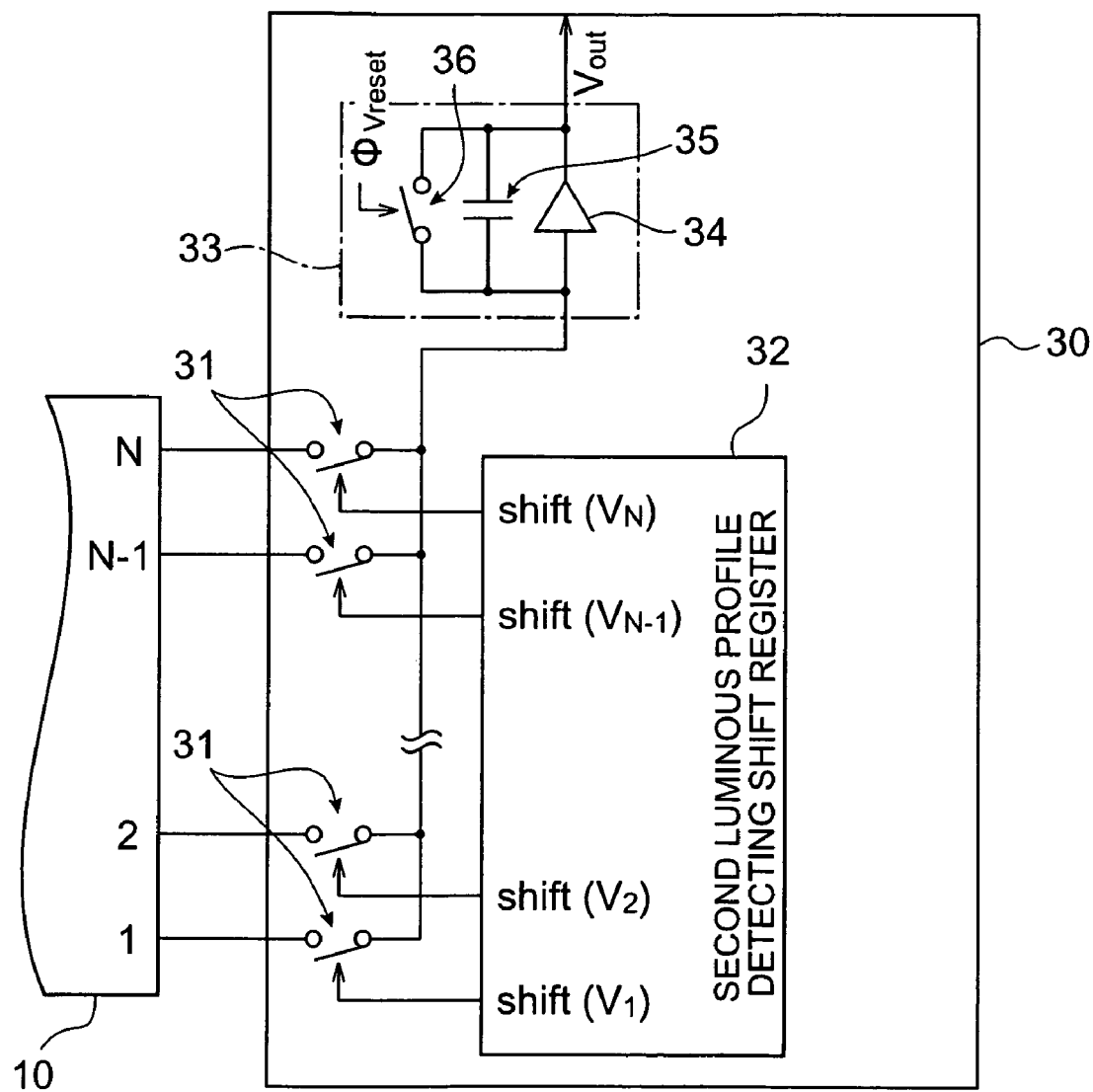
FIG. 5 is a schematic block diagram showing a second luminous profile detecting signal processing circuit included in the imaging device according to the present embodiment.

Hereinafter, configurations of the first luminous profile detecting signal processing circuit 20 and the second luminous profile detecting signal processing circuit 30 will be described based on FIGS. 4 and 5. FIG. 4 is a schematic block diagram showing the first luminous profile detecting signal processing circuit, and FIG. 5 is a schematic block diagram showing the second luminous profile detecting signal processing circuit.

The first luminous profile detecting signal processing circuit 20 outputs a voltage $H_{out}$ that indicates a luminous profile in the second direction of incident light to the photosensitive region 10. The second luminous profile detecting signal processing circuit 30 outputs a voltage $V_{out}$ that indicates a luminous profile in the first direction of incident light to the photosensitive region 10.

The first luminous profile detecting signal processing circuit 20 outputs a voltage $H_{out}$ indicating the luminous profile in the second direction of light incident to the photosensitive region 10. The second luminous profile detecting signal processing circuit 30 outputs a voltage $V_{out}$ indicating the luminous profile in the first direction of light incident to the photosensitive region 10.

As shown in FIG. 4, the first luminous profile detecting signal processing circuit 20 includes first switches 21, a first luminous profile detecting shift register 22, and a first integrating circuit 23. The first switches 21 are provided corresponding to each relevant group of photosensitive portions $14_{mn}$ on one side (M columns of long photosensitive portions configured of the second conductive type semiconductor regions 42, extending in the first direction). These photosensitive portions $14_{mn}$ are electrically connected across the plurality of pixels $11_{11}$ to $11_{1N}$, $11_{21}$ to $11_{2N}$, ..., and $11_{M1}$ to $11_{MN}$ arrayed in the first direction. The first luminous profile detecting shift register 22 sequentially reads electric currents in the second direction. The electric currents are from the group of photosensitive portions $14_{mn}$ on one side that are electrically connected across the plurality of pixels $11_{11}$ to $11_{1N}$, $11_{21}$ to $11_{2N}$, ..., and $11_{M1}$ to $11_{MN}$ arrayed in the first direction. The first integrating circuit 23 sequentially receives the electric currents, which are from each group of photosensitive portions $14_{mn}$ on one side and are sequentially connected by the first luminous profile detecting shift register 22. Then, the first integrating circuit 23 converts the electric current into voltage and outputs the voltage.

The first switches 21 are controlled by a signals shift ($H_m$) outputted from the first luminous profile detecting shift register 22, and then are sequentially closed. Electric charges are accumulated in the group of photosensitive portions $14_{mn}$ on one side that are electrically connected across the plurality of pixels $11_{11}$ to $11_{1N}$, $11_{21}$ to $11_{2N}$, ..., and $11_{M1}$ to $11_{MN}$ arrayed in the first direction. By closing the first switches 21, the above accumulated electric charges are changed into electric currents, which are then outputted to the first integrating circuit 23 through the third wires 48 and the first switches 21. Operations of the first luminous profile detecting shift register 22 are controlled by signals outputted from a control circuit (not shown), thus closing the first switches 21 sequentially.

The first integrating circuit 23 includes an amplifier 24, a capacitor 25, and a switch 26. The amplifier 24 is inputted the electric currents from the groups of photosensitive portions $14_{mn}$ on one side that are electrically connected across the plurality of pixels $11_{11}$ to $11_{1N}$, $11_{21}$ to $11_{2N}$, ..., and $11_{M1}$ to $11_{MN}$ arrayed in the first direction, and amplifies electric charges of the inputted electric currents. In the capacitor 25, one terminal thereof is connected to an input terminal of the amplifier 24, and the other terminal thereof is connected to an output terminal of the amplifier 24. In the switch 26, one terminal thereof is connected to the input terminal of the amplifier 24, and the other terminal thereof is connected to the output terminal of the amplifier 24. The switch 26 is turned to an "ON" state when a reset signal $\Phi_{Hreset}$ outputted from the control circuit is significant, and is turned to an "OFF" state when the reset signal $\Phi_{Hreset}$ is insignificant.

When the switch 26 is in the "ON" state, the first integrating circuit 23 discharges electricity to reset the capacitor 25. On the other hand, when the switch 26 is in the "OFF" state, the first integrating circuit 23 accumulates the electric charges in the capacitor 25. These electric charges have been inputted to the input terminal from the groups of photosensitive portions $14_{mn}$ on one side that are electrically connected across the plurality of pixels $11_{11}$ to $11_{1N}$, $11_{21}$ to $11_{2N}$, ..., and $11_{M1}$ to $11_{MN}$ arrayed in the first direction. Thereafter, the first integrating circuit 23 outputs voltages $H_{out}$ corresponding to the above-mentioned accumulated electric charges.

As shown in FIG. 5, the second luminous profile detecting signal processing circuit 30 includes second switches 31, a second luminous profile detecting shift register 32, and a second integrating circuit 33. The second switches 31 are provided corresponding to each relevant group of photosensitive portions $15_{mn}$ on the other side (N rows of long photosensitive portions configured of the second conductive type semiconductor regions 43, extending in the second direction). These photosensitive portions $15_{mn}$ are electrically connected across the plurality of pixels $11_{11}$ to $11_{M1}$, $11_{12}$ to $11_{M2}$, ..., and $11_{1N}$ to $11_{MN}$ arrayed in the second direction. The second luminous profile detecting shift register 32 sequentially reads electric currents in the first direction. The electric currents are from the groups of photosensitive portions $15_{mn}$ on the other side that are electrically connected across the plurality of pixels $11_{11}$, to $11_{M1}$, $11_{12}$ to $11_{M2}$, ..., and $11_{1N}$ to $11_{MN}$ arrayed in the second direction. The second integrating circuit 33 is sequentially inputted of the electric currents, which are from each group of photosensitive portions $15_{mn}$ on the other side and are sequentially connected by the second luminous profile detecting shift register 32. Then, the second integrating circuit 33 converts the electric currents into voltages and outputs the voltages.

The second switches 31 are controlled by a signals shift ($V_n$) outputted from the second luminous profile detecting shift register 32, and then are sequentially closed. Electric charges are accumulated in the groups of photosensitive portions $15_{mn}$ on the other side that are electrically connected across the plurality of pixels $11_{11}$ to $11_{M1}$, $11_{12}$ to $11_{M2}$, ..., and $11_{1N}$ to $11_{MN}$ arrayed in the second direction. By closing the second switches 31, the above accumulated electric charges are changed into electric currents, which are then inputted to the second integrating circuit 33 through the forth wires 49 and the second switches 31. Operations of the second luminous profile detecting shift register 32 are controlled by signals outputted from a control circuit (not shown), thus closing the second switches 31 sequentially.

The second integrating circuit 33 includes an amplifier 34, a capacitor 35, and a switch 36. The amplifier 34 is inputted the electric currents from the groups of photosensitive portions $15_{mn}$ on the other side that are electrically connected across the plurality of pixels $11_{11}$ to $11_{M1}$, $11_{12}$ to $11_{M2}$, ..., and $11_{1N}$ to $11_{MN}$ arrayed in the second direction, and amplifies electric charges of the inputted electric currents. In the capacitor 35, one terminal thereof is connected to an input terminal of the amplifier 34, and the other terminal thereof is connected to an output terminal of the amplifier 34. In the switch 36, one terminal thereof is connected to the input terminal of the amplifier 34, and the other terminal thereof is connected to the output terminal of the amplifier 34. The switch 36 is turned to an "ON" state when a reset signal $\Phi_{Vreset}$ outputted from the control circuit is significant, and is turned to an "OFF" state when the reset signal $\Phi_{Vreset}$ is insignificant.

When the switch 36 is in the "ON" state, the second integrating circuit 33 discharges electricity to reset the capacitor 35. On the other hand, when the switch 36 is in the "OFF" state, the second integrating circuit 33 accumulates the electric charges in the capacitor 35. These electric charges have been Inputted to the input terminal from the groups of photosensitive portions $15_{mn}$ on the other side that are electrically connected across the plurality of pixels $11_{11}$ to $11_{M1}$, $11_{12}$ to $11_{M2}$, ..., and $11_{1N}$ to $11_{MN}$ arrayed in the second direction. Thereafter, the second integrating circuit 33 outputs voltages $V_{out}$ corresponding to the above-mentioned accumulated electric charges.

Hereinafter, operations of the first luminous profile detecting signal processing circuit 20 and the second luminous profile detecting signal processing circuit 30 will be described based on FIGS. 6A to 6E and FIGS. 7A to 7E. FIGS. 6A to 6E are timing charts for explaining the operations of the first luminous profile detecting signal processing circuit. FIGS. 7A to 7E are timing charts for explaining the operations of the second luminous profile detecting signal processing circuit.

As shown in FIG. 6A, FIG. 6B and FIG. 6C, after the start signal is inputted to the first luminous profile detecting shift register 22 from the control circuit, signals shift ($H_m$), each having a predetermined pulse width, are sequentially outputted. When the first luminous profile detecting shift register 22 outputs the shift ($H_m$) to each of the corresponding first switches 21, the first switches 21 are sequentially closed. Thereafter, the electric charges accumulated in the corresponding group of photosensitive portions $14_{mn}$ on one side are turned into electric currents and are sequentially inputted to the first integrating circuits 23.

As shown in FIG. 6D, the reset signal $\Phi_{Hreset}$ is inputted to the first integrating circuit 23 from the control circuit. While the reset signal $\Phi_{Hreset}$ is in an "OFF" state, the electric charges accumulated in the corresponding group of photosensitive portions $14_{mn}$ on one side are accumulated in the capacitor 25. Then, as shown in FIG. 6E, voltages $H_{out}$ corresponding to amounts of the accumulated electric charges are sequentially outputted from the first integrating circuit 23. When the reset signal $\phi_{Hreset}$ is in an "ON" state, the first integrating circuit 23 closes the switch 26 and reset the capacitor 25.

In this way, the first luminous profile detecting signal processing circuit 20 sequentially outputs the voltages $H_{out}$ as time-series data of each of the corresponding groups of photosensitive portions $14_{mn}$ on one side. The voltages $H_{out}$ correspond to the electric charges (electric currents) accumulated in the groups of photosensitive portions $14_{mn}$ on one side that are electrically connected across the plurality of pixels $11_{11}$ to $11_{1N}$, $11_{21}$ to $11_{2N}$, ..., and $11_{M1}$ to $11_{MN}$ arrayed in the first direction. The time-series data indicates a luminous profile in the second direction.

As shown in FIG. 7A, FIG. 7B and FIG. 7C, after the start signal is inputted to the second luminous profile detecting shift register 32 from the control circuit, signals shift ($V_n$), each having a predetermined pulse width, are sequentially outputted. When the second luminous profile detecting shift register 32 outputs the shift ($V_n$) to each of the corresponding second switches 31, the second switches 31 are sequentially closed. Thereafter, the electric charges accumulated in the corresponding group of photosensitive portions $15_{mn}$ on one side are turned into electric currents and are sequentially inputted to the second integrating circuits 33.

As shown in FIG. 7D, the reset signal $\Phi_{Vreset}$ is inputted to the second integrating circuit 33 from the control circuit. While the reset signal $\Phi_{Vreset}$ is in an "OFF" state, the electric charges accumulated in the corresponding group of photosensitive portions $15_{mn}$ on the other side are accumulated in the capacitor 35. Then, as shown in FIG. 7E, voltages $V_{out}$ corresponding to amounts of the accumulated electric charges are sequentially outputted from the second integrating circuit 33. When the reset signal $\Phi_{Vreset}$ is in an "ON" state, the second integrating circuit 33 closes the switch 36 and reset the capacitor 35.

In this way, the second luminous profile detecting signal processing circuit 30 sequentially outputs the voltages $V_{out}$ as time-series data of each of the corresponding groups of photosensitive portions $15_{mn}$ on the other side. The voltages $V_{out}$ correspond to the electric charges (electric currents) accumulated in the groups of photosensitive portions $15_{mn}$ on the other side that are electrically connected across the plurality of pixels $11_{11}$ to $11_{M1}$, $11_{12}$ to $11_{M2}$, ..., and $11_{1N}$ to $11_{MN}$ arrayed in the first direction. The time-series data indicates a luminous profile in the second direction.

Figure 8:
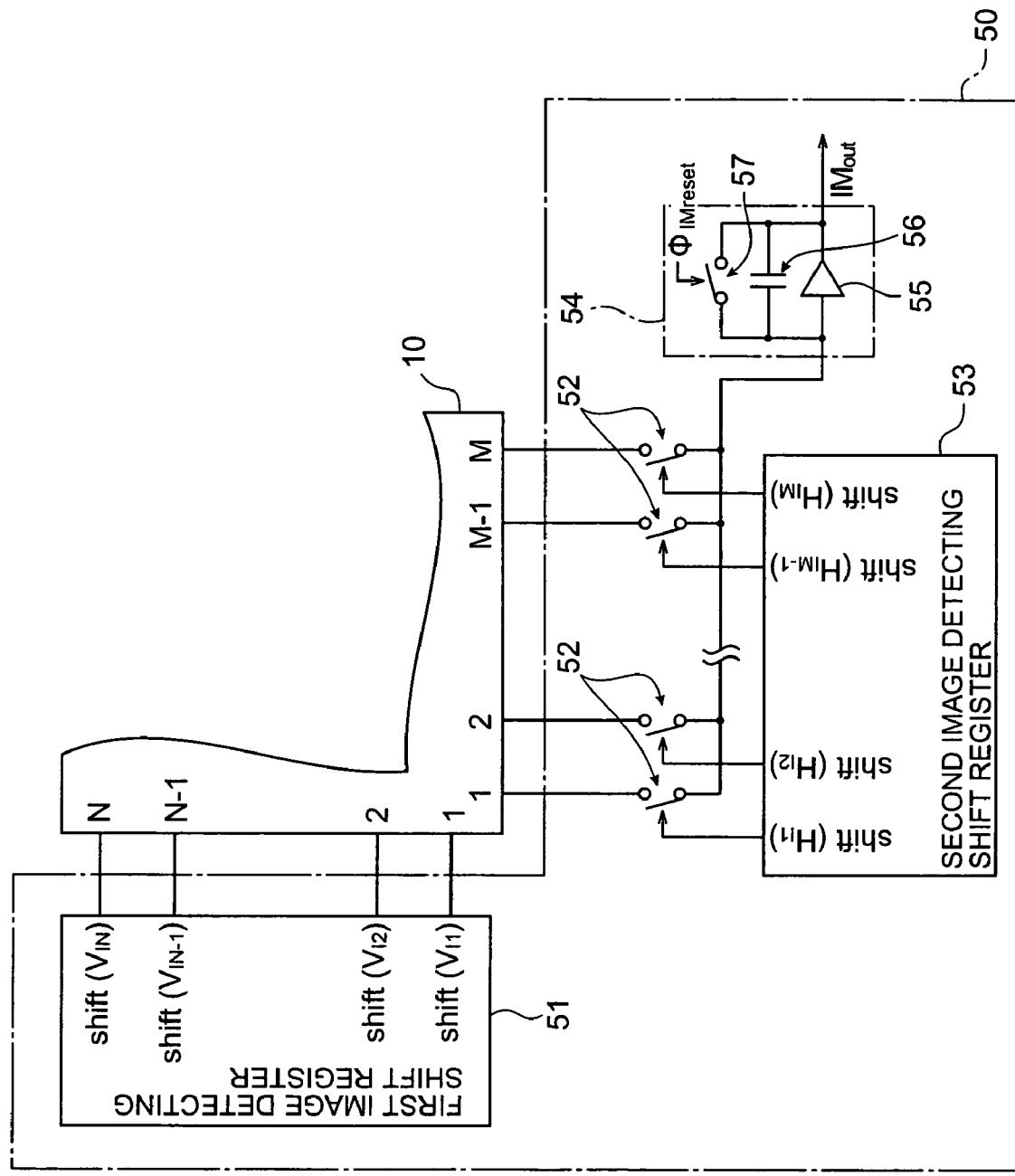
FIG. 8 is a schematic block diagram showing an image detecting element included in the imaging device according to the present embodiment.

Hereinafter, configurations of the image detecting signal processing circuit 50 will be described based on FIG. 8. FIG. 8 is a schematic block diagram showing a image detecting element. The image detecting signal processing circuit 50 outputs a voltage $IM_{out}$ indicating pixel data (image) corresponding to incident light to the photosensitive region 10.

The image detecting signal processing circuit 50 includes a first image detecting shift register 51, third switches 52, a second image detecting shift register 53, and a third integrating circuit 54. The first image detecting shift register 51 sequentially reads electric currents from each first photosensitive portion $12_{mn}$ in the first direction. The third switches 52 are provided corresponding to the pixels $11_{mn}$ arrayed in the second direction. The second image detecting shift register 53 sequentially reads the electric currents, which are sequentially read in the first direction by the first image detecting shift register 51, in the second direction. The third integrating circuit 54 sequentially receive the electric currents, which are from each first photosensitive portion $12_{mn}$ and are sequentially connected by the second image detecting shift register 53. Then, The third integrating circuits 54 converts the electric current into voltage and outputs the voltage.

Operations of the first image detecting shift register 51 are controlled by signals outputted from the control circuit (not shown) to read the electric current from each first photosensitive portion $12_{mn}$, and outputs a signal shift ($V_{In}$) to each MOS gate 46 (switch element 64). The first image detecting shift register 51 is connected through the second wire 47 to the MOS gates 46 (switch elements 64) of the first photosensitive portions $12_{mn}$ arrayed in the second direction so that the signal shift ($V_{In}$) can be simultaneously output to the MOS gates 46.

The third switches 52 are controlled by a signals shift ($H_{IM}$) outputted from the second image detecting shift register 53, and then are sequentially closed. Electric charges are accumulated in the first photosensitive portion $12_{mn}$ corresponding the the MOS gate 46 (switch element 64) closed by the signal shift ($V_{In}$) from the first image detecting shift register 51. By closing the third switches 52, the above accumulated electric charges are changed into electric currents, which are then outputted to the third integrating circuit 54 through the first wires 45 and the third switches 52. Operations of the second image detecting shift register 53 are controlled by signals outputted from a control circuit (not shown), thus closing the third switches 52 sequentially.

The third integrating circuit 54 includes an amplifier 55, a capacitor 56, and a switch 57. The amplifier 55 is inputted the electric currents from each first photosensitive portion $12_{mn}$, and amplifies electric charges of the inputted electric currents. In the capacitor 56, one terminal thereof is connected to an input terminal of the amplifier 55, and the other terminal thereof is connected to an output terminal of the amplifier 55. In the switch 57, one terminal thereof is connected to the input terminal of the amplifier 55, and the other terminal thereof is connected to the output terminal of the amplifier 55. The switch 57 is turned to an "ON" state when a reset signal $\Phi_{IMreset}$ outputted from the control circuit is significant, and is turned to an "OFF" state when the reset signal $\Phi_{IMreset}$ is insignificant.

When the switch 57 is in the "ON" state, the third integrating circuit 54 discharges electricity to reset the capacitor 56. On the other hand, when the switch 57 is in the "OFF" state, the third integrating circuit 54 accumulates the electric charges in the capacitor 56. These electric charges have been inputted to the input terminal from each first photosensitive portion $12_{mn}$. Thereafter, the third integrating circuit 54 outputs voltages $IM_{out}$ corresponding to the above-mentioned accumulated electric charges.

Hereinafter, operations of the image detecting signal processing circuit 50 will be described based on FIGS. 9A to 9F. FIGS. 9A to 9F are timing charts for explaining the operations of the image detecting signal processing circuit.

As shown in FIG. 9A and FIG. 9B, after the start signal is inputted to the first image detecting shift register 51 from the control circuit, signals shifts ($V_{In}$), each having a predetermined pulse width, are sequentially outputted. When the first image detecting shift register 51 outputs the shift ($V_{In}$) to each of the corresponding MOS gates 46, the MOS gates 46 are sequentially closed.

As shown in FIG. 9C and FIG. 9D, when the start signal is inputted from the control circuit to the second image detecting shift register 53 under the above state, signals shift ($H_{In}$) each having a predetermined pulse width, are sequentially outputted. When the second image detecting shift register 53 outputs the shift ($H_{In}$) to each of the corresponding third switches 52, the third switches 52 are sequentially closed. Thereafter, the electric charges accumulated in the corresponding first photosensitive portions $12_{mn}$ are turned into electric currents and are sequentially inputted to the third integrating circuit 54.

As shown in FIG. 9E, the reset signal $\Phi_{IMreset}$ is inputted to the third integrating circuit 54 from the control circuit. While the reset signal $\Phi_{IMreset}$ is in an "OFF" state, the electric charges accumulated in the corresponding first photosensitive portion $12_{mn}$ are accumulated in the capacitor 56. Then, as shown in FIG. 9F, voltages $IM_{out}$ corresponding to amounts of the accumulated electric charges are sequentially outputted from the third integrating circuit 54. When the reset signal $\Phi_{IMreset}$ is in an "ON" state, the third integrating circuit 54 closes the switch 57 and reset the capacitor 56.

In this way, the image detecting signal processing circuit 50 sequentially outputs the voltages $IM_{out}$, corresponding to the electric charges (electric currents) accumulated in the first photosensitive portion $12_{mn}$, as time-series data of each of the corresponding first photosensitive portion $12_{mn}$. The time-series data indicates pixel data (image).

The first luminous profile detecting signal processing circuit 20, the second luminous profile detecting signal processing circuit 30 and the image detecting signal processing circuit 50 may be operated simultaneously or individually in a time-series order.

As described above, in the imaging device 1 of this embodiment, light incident on one pixel $11_{mn}$ is detected by each of the first photosensitive portion $12_{mn}$ and the second photosensitive portion $13_{mn}$ that configure the pixel $11_{mn}$ concerned, and the output corresponding to the light intensity is gained for every photosensitive portion $12_{mn}$ and $13_{mn}$. The image detecting signal processing circuit 50 reads out the output from the first photosensitive portion $12_{mn}$ and detects an image on the basis of the output concerned. Furthermore, the luminous profile detecting element (the first luminous profile detecting signal processing circuit 20 and the second luminous profile detecting signal processing circuit 30) reads out the output from the second photosensitive portion $13_{mn}$, and detects the luminous profiles in the first direction and the second direction in the two-dimensional array on the basis of the output concerned. Since one pixel is configured by the first photosensitive portion $12_{mn}$ and the second photosensitive portion $13_{mn}$, it is possible to detect both the image and two-dimensional positions to where light is incident.

Furthermore, in the imaging device 1 of this embodiment, the first wire 45 and the second wire 47 for leading the outputs from the first photosensitive portions $12_{mn}$ to the image detecting signal processing circuit 50, and the third wire 48 and the fourth wire 49 for leading the outputs from the second photosensitive portions $13_{mn}$ to the luminous profile detecting element (the first luminous profile detecting signal processing circuit 20 and the second luminous profile detecting signal processing circuit 30) are disposed so as to extend between the pixels $11_{mn}$. Accordingly, each of the wires 45, 47, 48, 49, will not prevent light from being incident to the first photosensitive portions $12_{mn}$ and the second photosensitive portions $13_{mn}$, thus suppressing a detection sensitivity reduction.

Still furthermore, in the imaging device 1 of this embodiment, the second photosensitive portion $13_{mn}$ contains a plurality of photosensitive portions $14_{mn}$ and $15_{mn}$ which are arranged so as to be adjacent to one another on the same plane, the photosensitive portions $14_{mn}$ on one side, amongst the plurality of photosensitive portions $14_{mn}$ and $15_{mn}$ contained in the second photosensitive portions $13_{mn}$, are electrically connected to each other across the plurality of pixels $11_{11}$ to $11_{1N}$, $11_{21}$ to $11_{2N}$, ..., $11_{M1}$ to $11_{MN}$ arrayed in the first direction in the two-dimensional array; and the photosensitive portions $15_{mn}$ on the other side, amongst the plurality of photosensitive portions $14_{mn}$ and $15_{mn}$ contained in the second photosensitive portions $13_{mn}$, are electrically connected to each other across the plurality of pixels $11_{11}$ to $11_{M1}$, $11_{12}$ to $11_{M2}$, ..., $11_{1N}$ to $11_{MN}$ arrayed in the first direction in the two-dimensional array. Accordingly, light incident to second photosensitive portion $13_{mn}$ is detected by each of the photosensitive portions $14_{mn}$ and $15_{mn}$ contained in the second photosensitive portion $13_{mn}$ concerned, and electric current corresponding to the light intensity sensed by each photosensitive portion $14_{mn}$ and $15_{mn}$ is outputted. Since the photosensitive portions $14_{mn}$ on one side are electrically connected to each other across the plurality of pixels $11_{11}$ to $11_{1N}$, $11_{21}$ to $11_{2N}$, ..., $11_{M1}$ to $11_{MN}$ arrayed in the first direction in the two-dimensional array, electric currents from the photosensitive portions $14_{mn}$ on one side are thereafter transmitted to the first direction. Furthermore, since the photosensitive portions $15_{mn}$ on the other side are electrically connected to each other across the plurality of pixels $11_{11}$ to $11_{M1}$, $11_{12}$ to $11_{M2}$, . . . , $11_{1N}$ to $11_{MN}$ arrayed in the two-dimensional array, electric currents from the photosensitive portions $15_{mn}$ on the other side are thereafter transmitted to the second direction. As described above, the electric currents from the photosensitive portions $14_{mn}$ on one side are transmitted in the first direction, and the electric currents from the photosensitive portions $15_{mn}$ on the other side are transmitted in the second direction, so that both of the luminous profile in the first direction and the luminous profile in the second direction are obtained independently. As a result, fast detection of the two-dimensional positions of the incident light becomes possible with an extremely simple structure that a plurality of photosensitive portions $14_{mn}$ and $15_{mn}$ are arranged in one pixel.

Furthermore, in the imaging device 1 of this embodiment, it is preferable that the third fire 48 is disposed so as to extend in the first direction between the pixels $11_{mn}$, and the fourth wire 49 is disposed so as to extend in the second direction between the pixels $11_{mn}$. In the case of the above construction, each of the wires 48 and 49 will not prevent light from being incident to the photosensitive portions $12_{mn}$ and $13_{mn}$, thus suppressing a detection sensitivity reduction.

Still furthermore, in the imaging device 1 of this embodiment, the second photosensitive portion $13_{mn}$ outputs the electric current corresponding to the intensity of incident light, and the luminous profile detecting element (the first luminous profile detecting signal processing circuit 20, the second luminous profile detecting signal processing circuit 30) contain the first luminous profile detecting shift register 22, the second luminous profile detecting shift register 32, the first integrating circuit 23, and the second integrating circuit 33. Accordingly, the luminous profile in the first direction and the luminous profile in the second direction can be obtained with an extremely simple structure.

Still furthermore, in the imaging device 1 of this embodiment, the first photosensitive portion $12_{mn}$ outputs the electric current corresponding to the intensity of incident light, and the image detecting signal processing circuit 50 contains the first image detecting shift register 51, the second image detecting shift register 53, and the third integrating circuit 54. Accordingly, the image (pixel data) can be obtained with an extremely simple structure.

Figure 10:
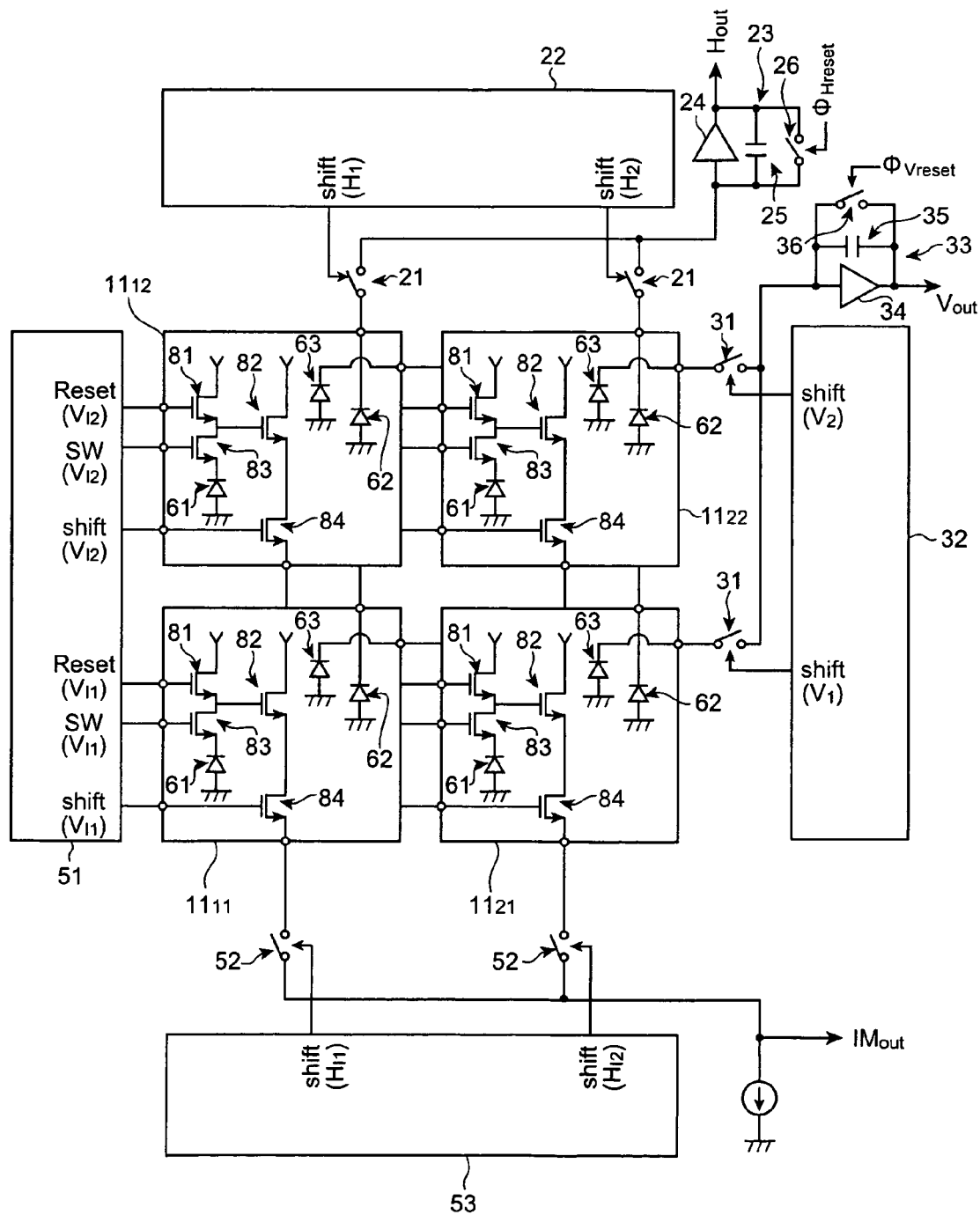
FIG. 10 is a schematic block diagram showing a modification example of the imaging device according to the present embodiment.

Next, a modification example of the imaging device according to the above embodiment will be described based on FIG. 10. FIG. 10 is a schematic block diagram showing a modification example of the imaging device according to the above embodiment. The modification example differs from the above embodiment in that the first photosensitive portion $12_{mn}$ is constructed as an active pixel sensor (APS: Active Pixel Sensor). In FIG. 10, it is illustrated as 2*2 pixels. In FIG. 10, respective wires extending from the same positions of respective pixels $11_{11}$, $11_{12}$, $11_{21}$, and $11_{22}$ are connected to one another.

Respective drains of field effect transistors (FET) 81 and 82 are connected to a power supply voltage, and a source of the transistor 81 and a gate of the transistor 82 are connected to a drain of a field effect transistor 83. A source of the transistor 83 is connected to a cathode of the photodiode 61. Furthermore, a source of the transistor 82 is connected to a drain, and a source of a transistor 84 is connected to a third switch element 52. A reset signal Reset ($V_{In}$) is supplied from the first image detecting shift register 51 to a gate of the transistor 81, and a signal SW ($V_{In}$) from the first image detecting shift register 51 to a gate of the transistor 83. Furthermore, a signal shift (VIn) is supplied from the first image detecting shift register 51 to a gate of the transistor 84.

Operations of the active pixel sensor will be described. First, the reset signal Reset ($V_{IN}$) is applied to the gate of the transistor 81 to turn on the transistor 81, and the cathodic potential of the photodiode 61 is set to the power supply potential (reset) via the drain and the source of the transistor 81. At this time, the transistor 83 is turned on, and the transistor 84 is turned off. Subsequently, the reset signal Reset ($V_{In}$) to the gate of the transistor 81 is quenched, and simultaneously the signal SW ($V_{In}$) is quenched, and thus the transistor 81 and the transistor 83 are turned off, whereby the cathodic potential of the photodiode 61 is kept to the power supply potential. Under this state, light is irradiated to the photodiode 61, the photodiode 61 photoelectrically converts the incident light, and the charges Q proportional to the irradiation light amount (intensity * time) are accumulated in the photodiode 61, so that the cathodic potential of the photodiode 61 suffers voltage variation of Q/C (here, C represents the capacitance of the photodiode 61).

Thereafter, the signal SW ($V_{In}$) is applied to the gate of the transistor 83, and the signal shift ($V_{In}$) is applied to the gate of the transistor 84, whereby the cathode voltage variation of the photodiode 61 described above is output as an image signal through the transistor 83, the transistor 82 and the transistor 84.

In this way, even when the first photosensitive portion $12_{mn}$ is constructed by the active pixel sensor, it is possible to detect both the image and two-dimensional positions to where light is incident.

Figure 11:
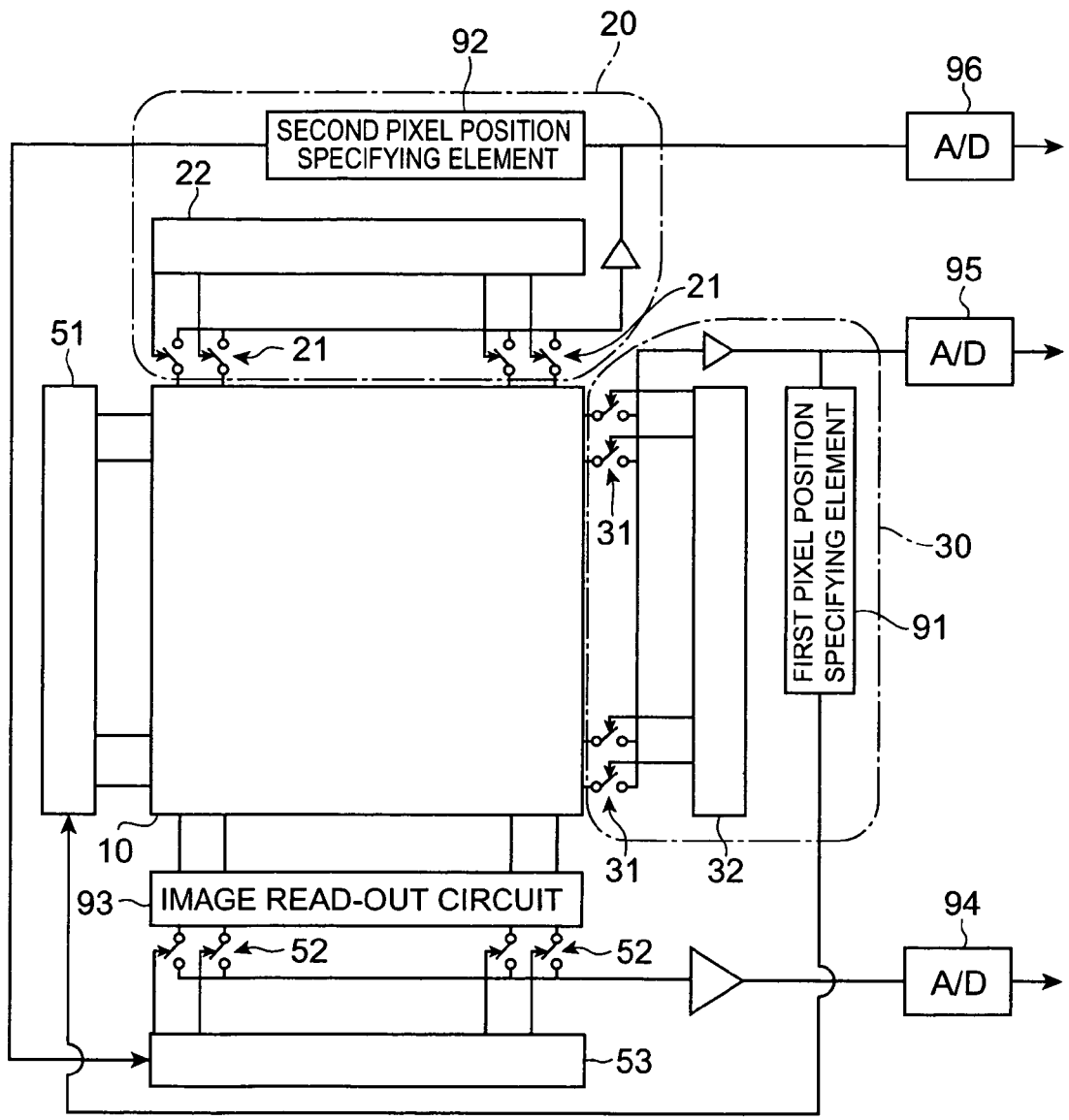
FIG. 11 is a schematic block diagram showing a modification example of the imaging device according to the present embodiment.

Next, another modification example of the imaging device according to the above embodiment will be described based on FIG. 11. FIG. 11 is a schematic block diagram showing a modification example of the imaging device according to the above embodiment.

In the modification shown in FIG. 11, the second luminous profile detecting signal processing circuit 30 (the luminous profile detecting element) includes a first pixel position specifying portion 91 for specifying pixel positions of a predetermined luminous or more in the luminous profile in the first direction. The output from each second switch 31 is connected to the first pixel position specifying portion 91 so that the electric currents from the group of photosensitive portions $15_{mn}$ on the other side are inputted to the first pixel position specifying portion 91. The photosensitive portions $15_{mn}$ on the other side are electrically connected to each other, across the plurality of pixels $11_{11}$ to $11_{M1}$, $11_{12}$ to $11_{M2}$, . . . , and $11_{1N}$ to $11_{MN}$ that are arrayed in the second direction.

The first pixel position specifying portion 91 specifies the pixel positions of the predetermined luminous or more on the basis of the inputted outputs, and outputs the information on the specified pixel positions as pixel information (channel information) to the first image detecting shift register 51. The pixel information contains pixel positions located around the pixel positions thus specified. The first image detecting shift register 51 sequentially outputs the shift ($V_{In}$) to only the MOS gates 46 corresponding to the pixel positions in the pixel information concerned on the basis of the pixel information fed from the first pixel position specifying portion 91, whereby only the MOS gates 46 corresponding to the pixel positions in the pixel information are sequentially closed.

The first luminous profile detecting signal processing circuit 20 (the luminous profile detecting element) includes a second pixel position specifying portion 92 for specifying pixel positions of a predetermined luminous or more in the luminous profile in the second direction. The output from each first switch 21 is connected to the second pixel position specifying portion 92 so that the electric currents from the group of photosensitive portions $14_{mn}$ on one side are inputted to the second pixel position specifying portion 92. The photosensitive portions $14_{mn}$ on one side are electrically connected to each other, across the plurality of pixels $11_{11}$ to $11_{1N}$, $11_{21}$ to $11_{2N}$, ..., and $11_{M1}$ to $11_{MN}$ that are arrayed in the first direction.

The second pixel position specifying portion 92 specifies the pixel positions of the predetermined luminous or more on the basis of the inputted outputs, and outputs the information on the specified pixel positions as pixel information (channel information) to the second image detecting shift register 53. The pixel information contains pixel positions located around the specified pixel positions. The second image detecting shift register 53 sequentially outputs the shift ($H_{Im}$) to only the third switch elements 52 corresponding to the pixel positions in the pixel information. Accordingly, only the third switch elements 52 corresponding to the pixel positions in the pixel information are sequentially closed, and the charges accumulated in the first photosensitive portions $12_{mn}$, corresponding to the pixel positions concerned are sequentially output as electric current through an image read-out circuit 93 and the third switch elements 52 to an A/D converting circuit 94. The outputs of the first luminous profile detecting signal processing circuit 20 and the second luminous profile detecting signal processing circuit 30 are fed to A/D converting circuits 95 and 96 to be subjected to A/D conversion, and then are outputted.

Figure 12A:
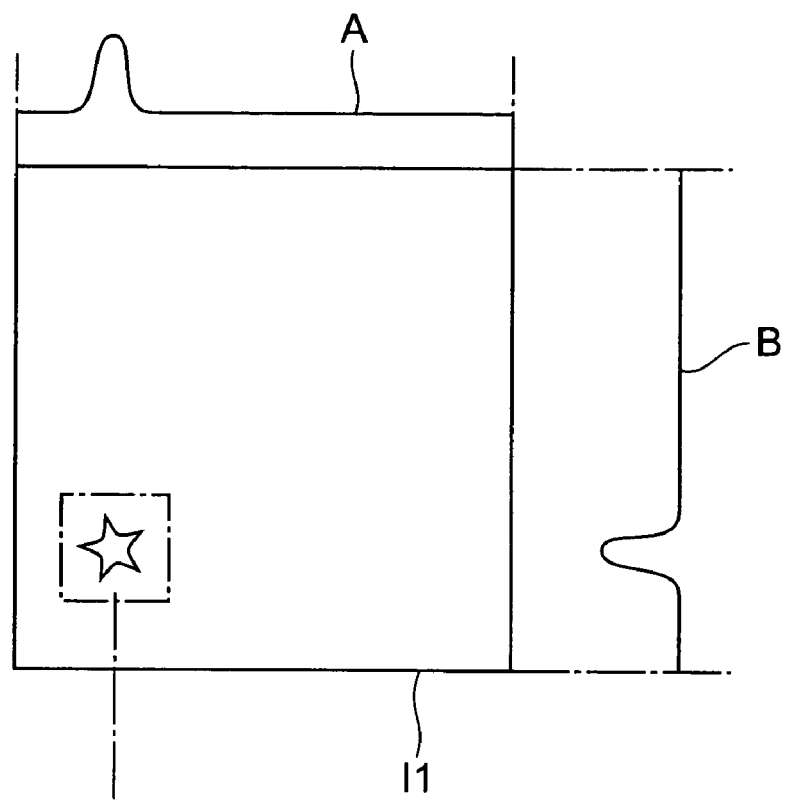
FIG. 12A is a diagram showing the operation of the modification example of the imaging device shown in FIG. 11.
Figure 12B:
FIG. 12B is a diagram showing the operation of the modification example of the imaging device shown in FIG. 11.

Accordingly, as shown in FIG. 12A and FIG. 12B, an image I2 (O*P pixels: M≧O, N≧P) of a predetermined area in which the luminous is equal to the predetermined luminous or more can be achieved for an image I1 (M*N pixels) detected in the overall photosensitive region 10. For example, under a condition where M=N=512, O=P=64 and the reading speed is set to 1 μsec/pixel, when the image I1 is read out, the frame rate is equal to 3.8 (fps), and when the image I2 is read out, the frame rate is equal to 244 (fps) In this way, it is possible to read image at high speed. In FIG. 12A, a characteristic A indicates the luminous profile in the second direction which is obtained by the first luminous profile detecting signal processing circuit 20, and a characteristic B indicates the luminous profile in the first direction which is obtained by the second luminous profile detecting signal processing circuit 30.

As described above, in the modification shown in FIG. 11, the image containing the area having the predetermined luminous or more can be detected at an extremely high speed. Furthermore, the imaging device 1 is applicable to a moving body tracking sensor or the like.

The present invention is not limited to the above embodiments. For example, in place of the arrangement where the second photosensitive portions $13_{mn}$ are disposed so as to be adjacent to the first photosensitive portions $12_{mn}$ on the same plane, a grid-shaped resistive element such as a ohmic electrode or the like may be disposed on the back side of the semiconductor substrate 40 on which the photosensitive region 10 is formed, and a change in resistance based on light incidence may be detected to obtain the luminous profile (light incident position) in the first direction and second direction.

INDUSTRIAL APPLICABILITY

The imaging device of the present invention can be applied for a moving body tracking device.

The invention claimed is:

1. An imaging device having a photosensitive region containing two-dimensionally arranged pixels,
   wherein one pixel is configured by a first photosensitive portion and a second photosensitive portion which output corresponding to the intensity of light incident thereto, and
   the imaging device comprises an image detecting element for reading an output from the first photosensitive portion and detecting an image on the basis of the output concerned; and
   a luminous profile detecting element for reading out an output from the second photosensitive portion and detecting luminous profiles in a first direction and a second direction in the two-dimensional array on the basis of the output concerned.

2. The imaging device according to claim 1,
   wherein a wire for leading the outputs from the first photosensitive portions to the image detecting element and a wire for leading the outputs from the second photosensitive portions to the luminous profile detecting element are disposed so as to extend between the pixels.

3. The imaging device according to claim 1,
   wherein the second photosensitive portion contains a plurality of photosensitive portions which are arranged so as to be adjacent to one another on the same plane,
   the photosensitive portions on one side, amongst the plurality of photosensitive portions contained in the second photosensitive portions, are electrically connected to each other across the plurality of pixels arrayed in the first direction in the two-dimensional array; and
   the photosensitive portions on the other side, amongst the plurality of photosensitive portions contained in the second photosensitive portions, are electrically connected to each other across the plurality of pixels arrayed in the second direction in the two-dimensional array.

4. The imaging device according to claim 3,
   wherein a wire is provided-for electrically connecting the photosensitive portions on the other side, amongst the plurality of photosensitive portions contained in the second photosensitive portions, to each other across the plurality of pixels arrayed in the first direction, the wire is disposed so as to extend in the first direction between the pixels, and
   a wire is provided for electrically connecting the photosensitive portions on one side, amongst the plurality of photosensitive portions contained in the second photosensitive portions, to each other across the plurality of pixels arrayed in the second direction, the wire is disposed so as to extend in the second direction between the pixels.

5. The imaging device according to claim 3,
   wherein the second photosensitive portion outputs an electric current corresponding to the intensity of incident light, and
   the luminous profile detecting element comprises: a first luminous profile detecting shift register for sequentially reading electric currents in the second direction, the electric currents being from groups of the photosensitive portions on one side which are electrically connected across the plurality of pixels arrayed in the first direction;

a second luminous profile detecting shift register for sequentially reading electric currents in the first direction, the electric currents being from groups of the photosensitive portions on the other side which are electrically connected across the plurality of pixels arrayed in the second direction;

a first integrating circuit for sequentially receiving the electric currents from each of the groups of photosensitive portions on one side, the electric currents being sequentially read by the first luminous profile detecting shift register, and converts the electric currents into voltages; and a second integrating circuit for sequentially receiving the electric currents from each of the groups of photosensitive portions on the other side, the electric currents being sequentially read by the second luminous profile detecting shift register, and converts the electric currents into voltages.

6. The imaging device according to claim 1, wherein the first photosensitive portion outputs an electric current corresponding to the intensity of incident light, and the image detector comprises a first image detecting shift register for sequentially reading electric currents from the first photosensitive portions in the first direction; and a second image detecting shift register for sequentially reading electric currents in the second direction, the electric currents being sequentially read by first image detecting shift register.

7. The imaging device according to claim 1, wherein the luminous profile detecting element contains a first image position specifying element for specifying pixel positions having predetermined luminous or more in the detected luminous profile in the first direction; and a second image position specifying element for specifying pixel positions having predetermined luminous or more in the detected luminous profile in the second direction, and wherein the image detecting element detects an image containing the respective pixel positions specified by the first pixel position specifying element and the second pixel position specifying element.

* * * * *